United States Patent
Umland et al.

(10) Patent No.: US 11,392,696 B1
(45) Date of Patent: Jul. 19, 2022

(54) SYSTEMS AND METHODS FOR DETECTING CODE IMPLANTED INTO A PUBLISHED APPLICATION

(71) Applicant: CA, INC., San Jose, CA (US)

(72) Inventors: Torrey Umland, Torrance, CA (US); Nathaniel Theis, Los Angeles, CA (US)

(73) Assignee: CA, INC., New York, NY (US)

(*) Notice: Subject to any disclaimer, the term of this patent is extended or adjusted under 35 U.S.C. 154(b) by 673 days.

(21) Appl. No.: 16/368,565

(22) Filed: Mar. 28, 2019

(51) Int. Cl.
*G06F 21/56* (2013.01)
*G06F 8/40* (2018.01)

(52) U.S. Cl.
CPC .............. *G06F 21/563* (2013.01); *G06F 8/40* (2013.01); *G06F 21/568* (2013.01); *G06F 2221/033* (2013.01)

(58) Field of Classification Search
CPC ........ G06F 21/563; G06F 8/40; G06F 21/568; G06F 2221/033; G06F 8/71; G06F 11/3604; G06F 11/3612; G06F 11/368
See application file for complete search history.

(56) References Cited

U.S. PATENT DOCUMENTS

| | | | |
|---|---|---|---|
| 9,244,679 B1 * | 1/2016 | Arellano | G06F 8/70 |
| 9,547,579 B1 * | 1/2017 | Shen | G06F 11/36 |
| 9,904,614 B2 * | 2/2018 | Stevens | G06F 11/3624 |
| 10,146,676 B1 * | 12/2018 | Khanduri | G06F 11/3688 |

* cited by examiner

*Primary Examiner* — Paul E Callahan
(74) *Attorney, Agent, or Firm* — Foley & Lardner LLP

(57) ABSTRACT

The disclosed computer-implemented method for detecting code implanted into a published application may include retrieving a published version of an application and a source version of the application, and determining, based on an analysis of the source version and the published version, a transformation process for transforming from the source version to the published version. The method may also include performing the transformation process on the source version to produce a build version, comparing the build version with the published version, and identifying, based on the comparison, implanted code in the published version. The method may further include performing, in response to identifying the implanted code, a security action. Various other methods, systems, and computer-readable media are also disclosed.

20 Claims, 7 Drawing Sheets

SYSTEMS AND METHODS FOR DETECTING CODE IMPLANTED INTO A PUBLISHED APPLICATION

BACKGROUND

Applications are often distributed online to client devices through the internet. In particular, web applications may reside online and may be accessed from public servers. Web applications may utilize script libraries which may be published to public repositories. The public repositories may maintain and make readily available updated versions of the script libraries. Although developers may be able to protect their own libraries on their own repositories, the published libraries on public repositories may be vulnerable to supply chain attacks. Due to the multiple dependencies between libraries in open source software, detecting code that was implanted via a supply chain code injection attack may be difficult. In addition, developers often minify their libraries when publishing but do not make pre-minified version available. Thus, implanted code in a published library may not be readily detectable.

The instant disclosure, therefore, identifies and addresses a need for systems and methods for detecting code implanted into a published application.

SUMMARY

As will be described in greater detail below, the instant disclosure describes various systems and methods for detecting code implanted into a published application.

In one example, a method for detecting code implanted into a published application, at least a portion of the method being performed by a computing device comprising at least one processor, may include (a) retrieving, by the computing device, a published version of an application and a source version of the application, (b) determining, by the computing device and based on an analysis of the source version and the published version, a transformation process for transforming the application from the source version to the published version, (c) performing, by the computing device, the transformation process on the source version to produce a build version of the application, (d) comparing, by the computing device, the build version with the published version, (e) identifying, by the computing device and based on the comparison, implanted code in the published version, and (f) performing, by the computing device and in response to identifying the implanted code, a security action.

In some examples, the security action may comprise one or more of quarantining the application, flagging the implanted code, removing the implanted code from the published version, sending a notification, and performing additional security analysis In some examples, the method may further comprise verifying that the source version corresponds to the published version by determining whether the source version and the published version include matches for at least one of files, identification tags, and commit tags.

In some examples, determining the transformation process may comprise determining the transformation process based on at least one of a project specification associated with the source version, a configuration setup associated with the source version, and a common configuration.

In some examples, comparing the build version with the published version may comprise maintaining a correspondence score based on at least one of (1) performing a byte-for-byte comparison between the build version and the published version, (2) tokenizing the build version and the published version and comparing a type or order of tokens between the build version and the published version, and (3) executing the build version and the published version and comparing outputs of the build version and the published version. Identifying the implanted code comprises determining whether the correspondence score satisfies a threshold confidence value.

In some examples, the transformation process may comprise a minification process for removing non-essential bits from the source version. In some examples, the published version may be retrieved from a public repository. In some examples, the source version may be retrieved from a source repository.

In one embodiment, a system for detecting code implanted into a published application may include at least one physical processor and physical memory that includes computer-executable instructions that, when executed by the physical processor, cause the physical processor to (a) retrieve a published version of an application and a source version of the application, (b) determine, based on an analysis of the source version and the published version, a transformation process for transforming from the source version to the published version, (c) perform the transformation process on the source version to produce a build version, (d) compare the build version with the published version, (e) identify, based on the comparison, implanted code in the published version, and (f) perform, in response to identifying the implanted code, a security action.

In some examples, the security action may comprise one or more of quarantining the application, flagging the implanted code, removing the implanted code from the published version, sending a notification, and performing additional security analysis.

In some examples, the instructions may further cause the processor to verify that the source version corresponds to the published version by determining whether the source version and the published version include matches for at least one of files, identification tags, and commit tags.

In some examples, determining the transformation process may further comprise determining the transformation process based on at least one of a project specification associated with the source version, a configuration setup associated with the source version, and a common configuration.

In some examples, comparing the build version with the published version may comprise maintaining a correspondence score based on at least one of (1) performing a byte-for-byte comparison between the build version and the published version, (2) tokenizing the build version and the published version and comparing a type or order of tokens between the build version and the published version, and (3) executing the build version and the published version and comparing outputs of the build version and the published version. Identifying the implanted code may comprise determining whether the correspondence score satisfies a threshold confidence value.

In some examples, the transformation process may comprise a minification process for removing non-essential bits from the source version. In some examples, the published version may be retrieved from a public repository, and the source version may be retrieved from a source repository.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (a) retrieve a published version of an application and a source version of the application, (b) determine, based on an analysis of the source version and the published version, a transformation process for transforming from the source version to the published version, (c) perform the transformation process on the source version to produce a build version, (d) compare the build version with the published version, (e) identify, based on the comparison, implanted code in the published version, and (f) perform, in response to identifying the implanted code, a security action.

In some examples, the security action may comprise one or more of quarantining the application, flagging the implanted code, removing the implanted code from the published version, sending a notification, and performing additional security analysis.

In some examples, the instructions may further comprise instructions for verifying that the source version corresponds to the published version by determining whether the source version and the published version include matches for at least one of files, identification tags, and commit tags.

In some examples, determining the transformation process may further comprise determining the transformation process based on at least one of a project specification associated with the source version, a configuration setup associated with the source version, and a common configuration.

In some examples, comparing the build version with the published version may comprise maintaining a correspondence score based on at least one of (1) performing a byte-for-byte comparison between the build version and the published version, (2) tokenizing the build version and the published version and comparing a type or order of tokens between the build version and the published version, and (3) executing the build version and the published version and comparing outputs of the build version and the published version. Identifying the implanted code may comprise determining whether the correspondence score satisfies a threshold confidence value.

In some examples, the transformation process may comprise a minification process for removing non-essential bits from the source version. In some examples, the published version may be retrieved from a public repository and the source version may be retrieved from a source repository.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
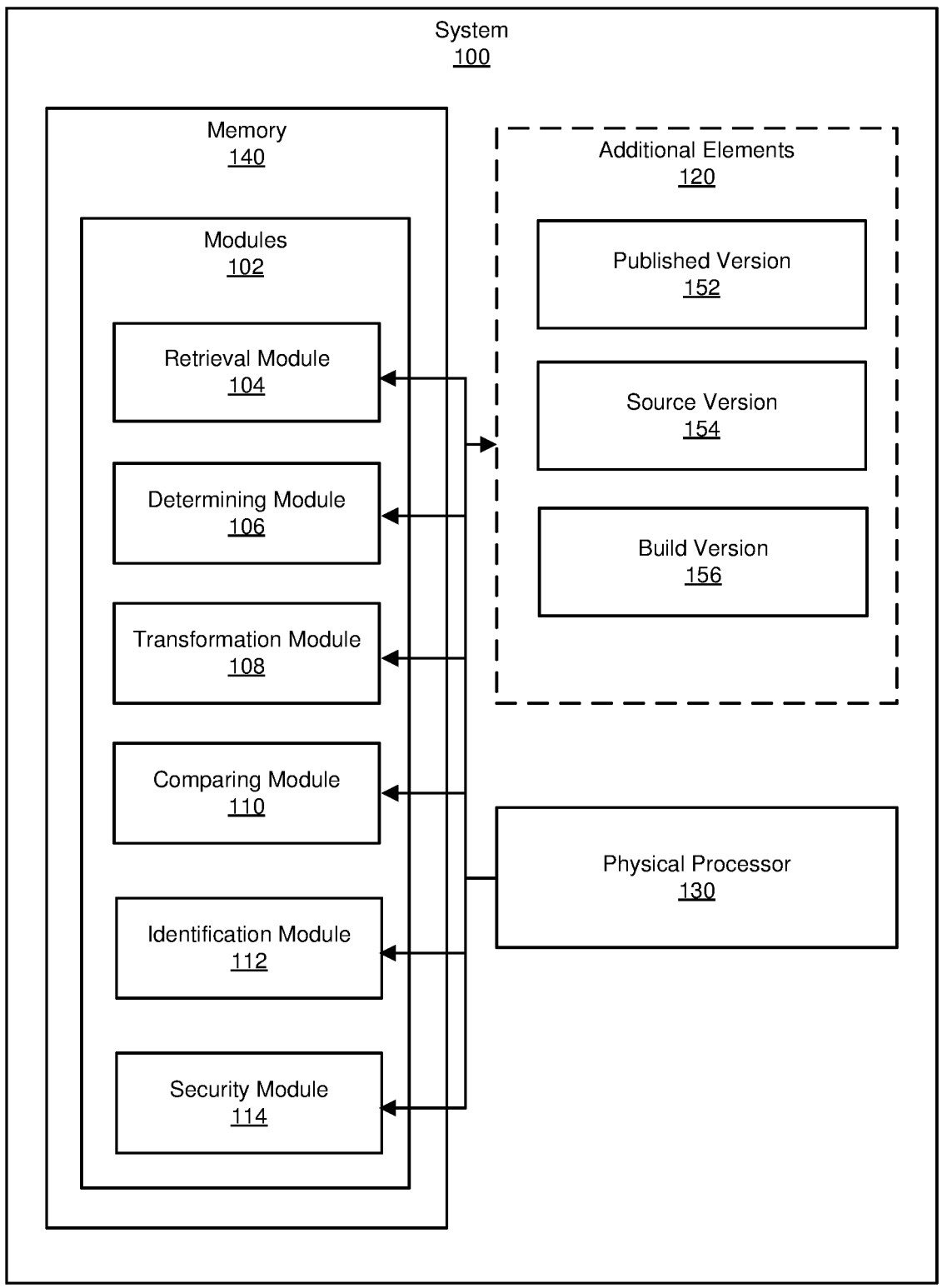
FIG. 1 is a block diagram of an example system for detecting code implanted into a published application.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for detecting code implanted into a published application. As will be explained in further detail below, by retrieving a source version of an application the systems and methods described herein may produce a build version using the same transformation process as was performed for a published version of the application. The build version may be used as a control for comparing the published version. Any differences detected in the published version from the build version may indicate implanted code in the published version. A security action may be performed in response to detecting the implanted code.

In addition, the systems and methods described herein may improve the functioning of a computing device by detecting potential harmful code and/or files with increased accuracy and reduce security threats to the computing device. These systems and methods may also improve the field of computer security, in particular supply chain protection, by providing feasible tools for detecting unwanted changes to published application code.

Figure 2:
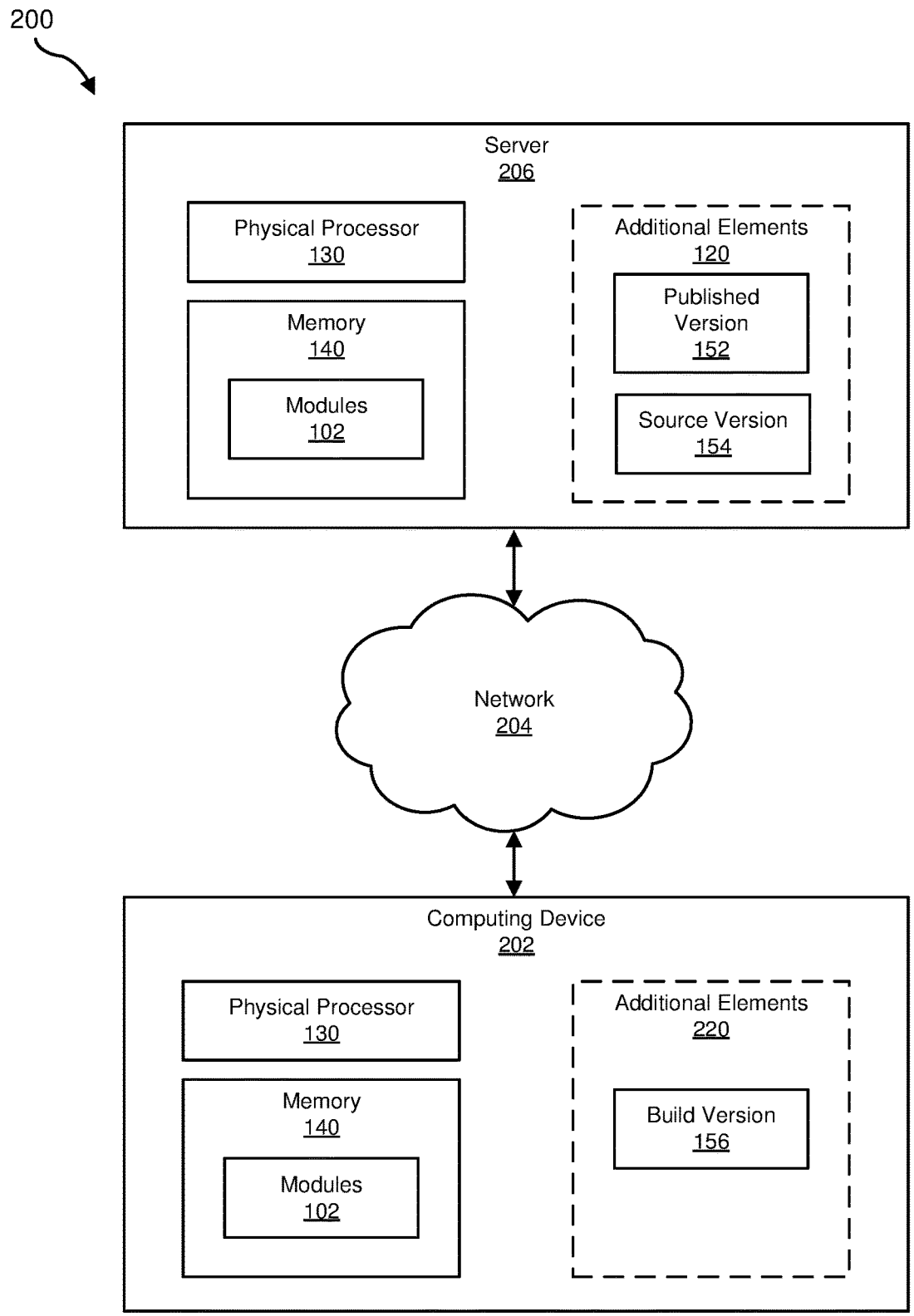
FIG. 2 is a block diagram of an additional example system for detecting code implanted into a published application.
Figure 3:
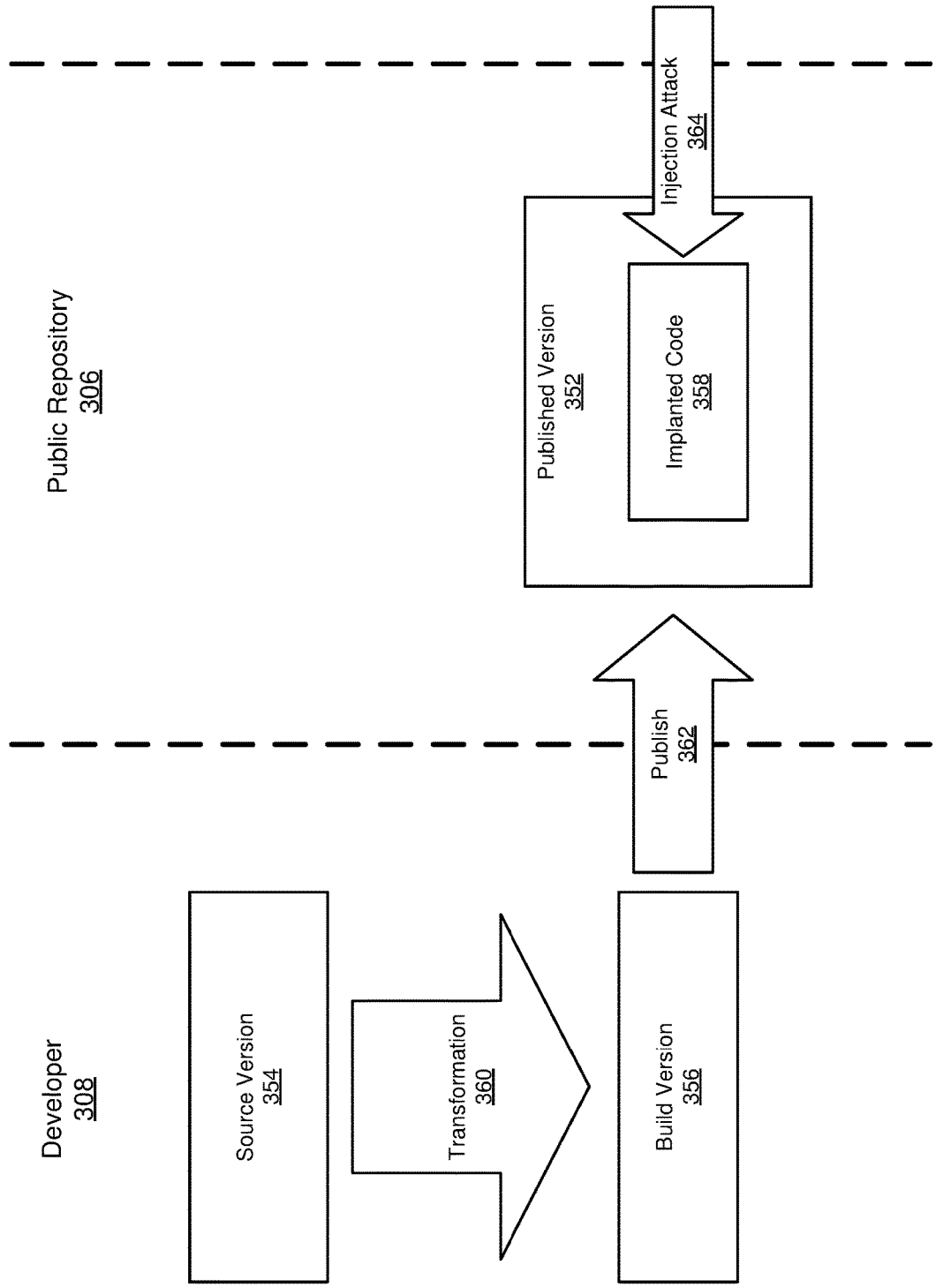
FIG. 3 is a block diagram of an example environment with code implanted into a published application.

The following will provide, with reference to FIGS. 1-3, detailed descriptions of example systems for detecting code implanted into a published application. Detailed descriptions of corresponding computer-implemented methods will also be provided in connection with FIG. 4. Detailed descriptions of comparison of different transformed versions of code will be provided in connection with FIG. 5. In addition, detailed descriptions of an example computing system and network architecture capable of implementing one or more of the embodiments described herein will be provided in connection with FIGS. 6 and 7, respectively.

FIG. 1 is a block diagram of an example system 100 for detecting code implanted into a published application. As illustrated in this figure, example system 100 may include one or more modules 102 for performing one or more tasks. As will be explained in greater detail below, modules 102 may include a retrieval module 104, a determining module 106, a transformation module 108, a comparing module 110, and an identification module 112. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate detecting code implanted into a published application. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more additional elements 120, such as a published version 152, a source version 154, and/or a build version 156 which may be stored in memory 140. Published version 152 may be a published version of an application which may be available to the public for use. For instance, published version 152 may be available from a public repository (e.g., server 206 and/or public repository 306). Source version 154 may be a developer version of the application which may undergo one or more transformation before being published. For instance, source version 154 may be source code which may undergo compiling or another transformation. In addition, source version 154 may be compiled code or otherwise executable code which may undergo one or more non-essential transformations, such as optimizations, which may facilitate publishing the application. Build version 156 may be a version of source version 154 which has been built, using the same or similar transformation as published version 152, independently from the developer and/or publisher of the application.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to detect whether code may have been implanted into the published application. For example, and as will be described in greater detail below, one or more of modules 102 may cause computing device 202 and/or server 206 to retrieve source version 154 and published version 152, build build version 156 from source version 154, and compare build version 156 with published version 152.

Computing device 202 generally represents any type or form of computing device capable of reading computer-executable instructions. Computing device 202 may be a client device, such as a user's device, or may be an analysis tool for an independent party which may monitor published applications for security threats. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device. Computing device 202 may include build version 156.

Server 206 generally represents any type or form of computing device that is capable of hosting data, such as published and/or source versions of applications. Server 206 may be a public repository (e.g., public repository 306) which may host versions of applications which are available for use by the public (e.g., published version 152). In addition, server 206 may be a source repository which may host source versions of applications (e.g., source version 154). In some examples, the public repository and the source repository may reside on separate servers. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

FIG. 3 is a diagram illustrating how an injection attack may occur. A developer 308 may correspond to a development system or environment used by a developer to develop an application, including a source version 354 of the application. A public repository 306 may host a published version 352 of the application. The application may be a complete application in that users may run the application as a complete product. Alternatively, the application may be a partial application, such as a library which may be used in other applications.

Source version 354 may be a version of the application developed by developer 308 which may not have been optimized for publishing. For example, source version 354 may be source code which may require compiling. Source version 354 may be executable code, such as a script or compiled code, which may undergo further optimizing before being published.

Transformation 360 may include one or more transformations which may convert source version 354 into build version 356. For example, transformation 360 may include compiling code if source version 354 includes source code. Transformation 360 may include optimizations which may facilitate publishing the application. For instance, transformation 360 may include minification, compression, encryption, etc. Moreover, although FIG. 3 illustrates developer 308 performing transformation 360, in other implementations transformation 360 may be performed independently from developer 308, such as being an operation of a publish 362 process.

Performing transformation 360 on source version 354 may generate build version 356. Build version 356 may be an executable version of the application such that users may use build version 356. However, developer 308 may not directly host build version 356 to the public and may instead publish 362 build version 356 to public repository 306 as published version 352. Users may then access published version 352 in order to use the application.

Because published version 352 may be outside of the control and/or monitoring by developer 308, published version 352 may be vulnerable to a supply chain attack which may target vulnerabilities in software deployment. For example, an injection attack 364 may insert implanted code 358 into published version 352. Injection attack 364 may include any process which alters data such that implanted code 358 is included into published version 352. Implanted code 358 may be malicious code which when executed causes security breaches. Thus, when users wish to use the application, they may unknowingly execute implanted code 358.

In certain application environments, such as scripting languages and particularly script libraries, source version 354 may be available from a source repository. Published version 352 may be optimized for more efficient deployment and thus may be favorable for public use. Direct comparison between source version 354 and published version 352 to verify that published version 352 has not been altered may not be feasible. For example, transformation 360 may create changes to source version 354 that would trigger false positives in direct comparisons. Direct comparison between published version 352 and build version 356 may provide accurate detection of implanted code 358. However, developers may not publicly release build version 356, such as when transformation 360 includes minification.

Figure 4:
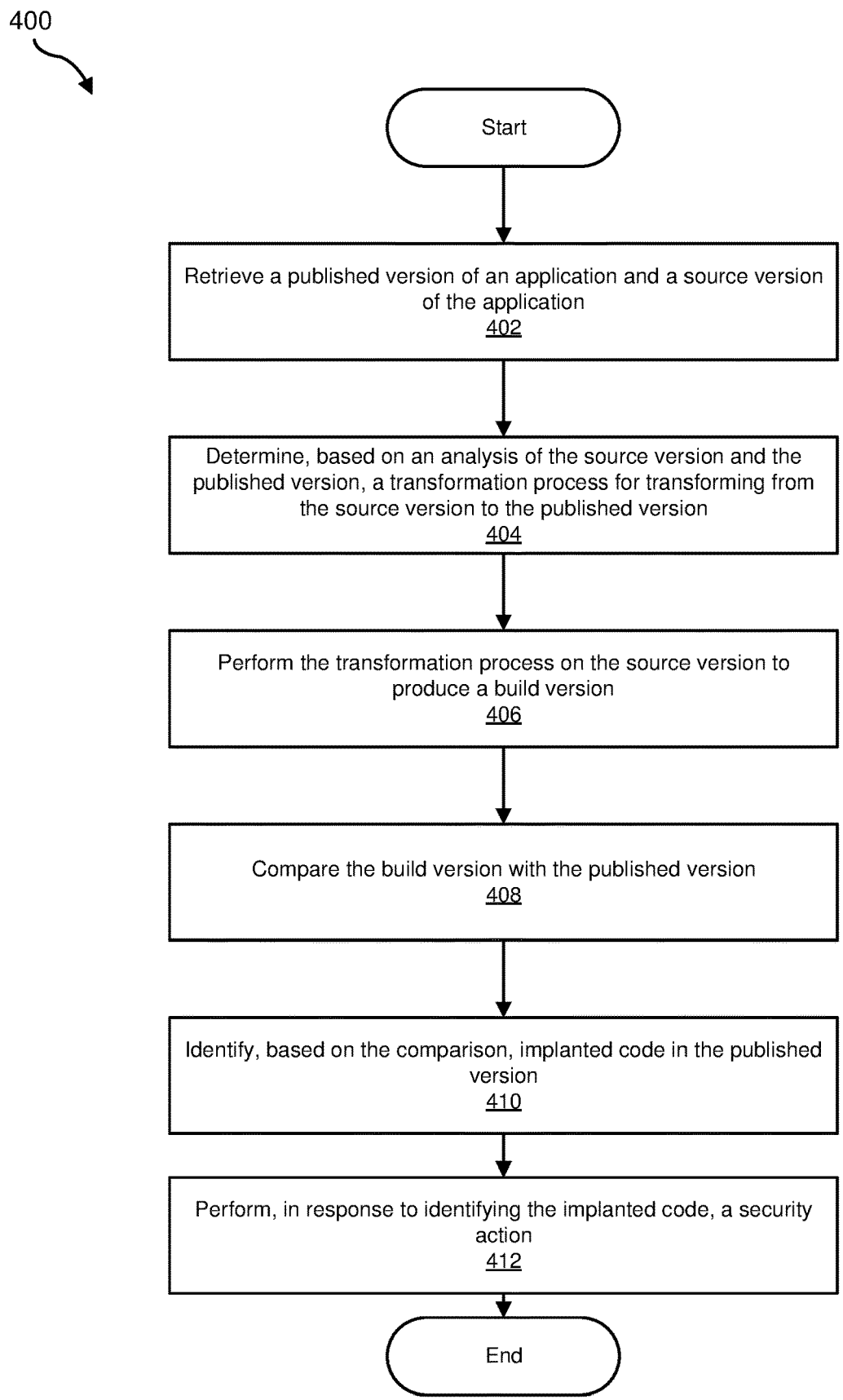
FIG. 4 is a flow diagram of an example method for detecting code implanted into a published application.

FIG. 4 is a flow diagram of an example computer-implemented method 400 for detecting code implanted into a published application. The steps shown in FIG. 4 may be performed by any suitable computer-executable code and/or computing system, including system 100 in FIG. 1, system 200 in FIG. 2, and/or variations or combinations of one or more of the same. In one example, each of the steps shown in FIG. 4 may represent an algorithm whose structure includes and/or is represented by multiple sub-steps, examples of which will be provided in greater detail below.

As illustrated in FIG. 4, at step 402 one or more of the systems described herein may retrieve a published version of an application and a source version of the application. For example, retrieval module 104 may, as part of computing device 202 in FIG. 2, retrieve published version 152 and source version 154.

The term "published version," as used herein, generally refers to a version of an application or part thereof made available to the public. Examples of published versions include, without limitation, compiled code, minified code, packaged code, libraries, etc. The term "source version," as used herein, generally refers to a developmental version of an application or part thereof which may not be suitable for use by the general public. Examples of source versions include, without limitation, source code, scripts, libraries, etc.

The systems described herein may perform step 402 in a variety of ways. In one example, published version 152 may be retrieved from a public repository (e.g., public repository 306 and/or server 206). Source version 154 may be retrieved from a source repository such as server 206.

In some examples, retrieval module 104 may, as part of computing device 202, may verify that source version 154 corresponds to published version 152 by determining whether source version 154 and published version 152 include matches for at least one of files, identification tags, and commit tags. The file names, number of files, sizes of files, etc. of source version 154 may be compared to that of published version 152. The public repository and/or the source repository may include metadata, such as identification tags for identifying projects, build version numbers, build dates, etc. and/or commit tags for identifying commit versions and commit dates. Matching attributes between source version 154 and published version 152 may indicate they correspond to the same build. Using inconsistent build version numbers between the source and published versions may result in legitimate changes in code raising false positives as implanted code.

As illustrated in FIG. 4, at step 404 one or more of the systems described herein may determine, based on an analysis of the source version and the published version, a transformation process for transforming from the source version to the published version. For example, determining module 106 may, as part of computing device 204 in FIG. 2, determine the transformation process between source version 154 and published version 152.

The term "transformation process," as used herein, generally refers to any process which may change the form of software code without necessarily changing its operations. Examples of transformation processes include, without limitation, compiling, minification, compression, encryption, packaging, etc.

The systems described herein may perform step 404 in a variety of ways. In one example, the transformation process may be determined based on at least one of a project specification associated with the source version, a configuration setup associated with the source version, and a common configuration. For instance, determining module 106 may read metadata from the public repository (e.g., public repository 306 and/or server 206). The project specification, configuration setup and/or common configuration may include details as to one or more of compiler settings and parameters, optimization settings, minification settings, compression settings, encryption settings, etc. The project specification and/or configuration setup may be available with source version 154, for instance from the source repository. The common configuration may be based on a default or otherwise publicly available configuration. In certain environments, such as script libraries, the transformation process may include a minification process for removing non-essential bits from the source version. In some embodiments, analysis of source version 154 and published version 152 may indicate the transformation process.

Figure 5:
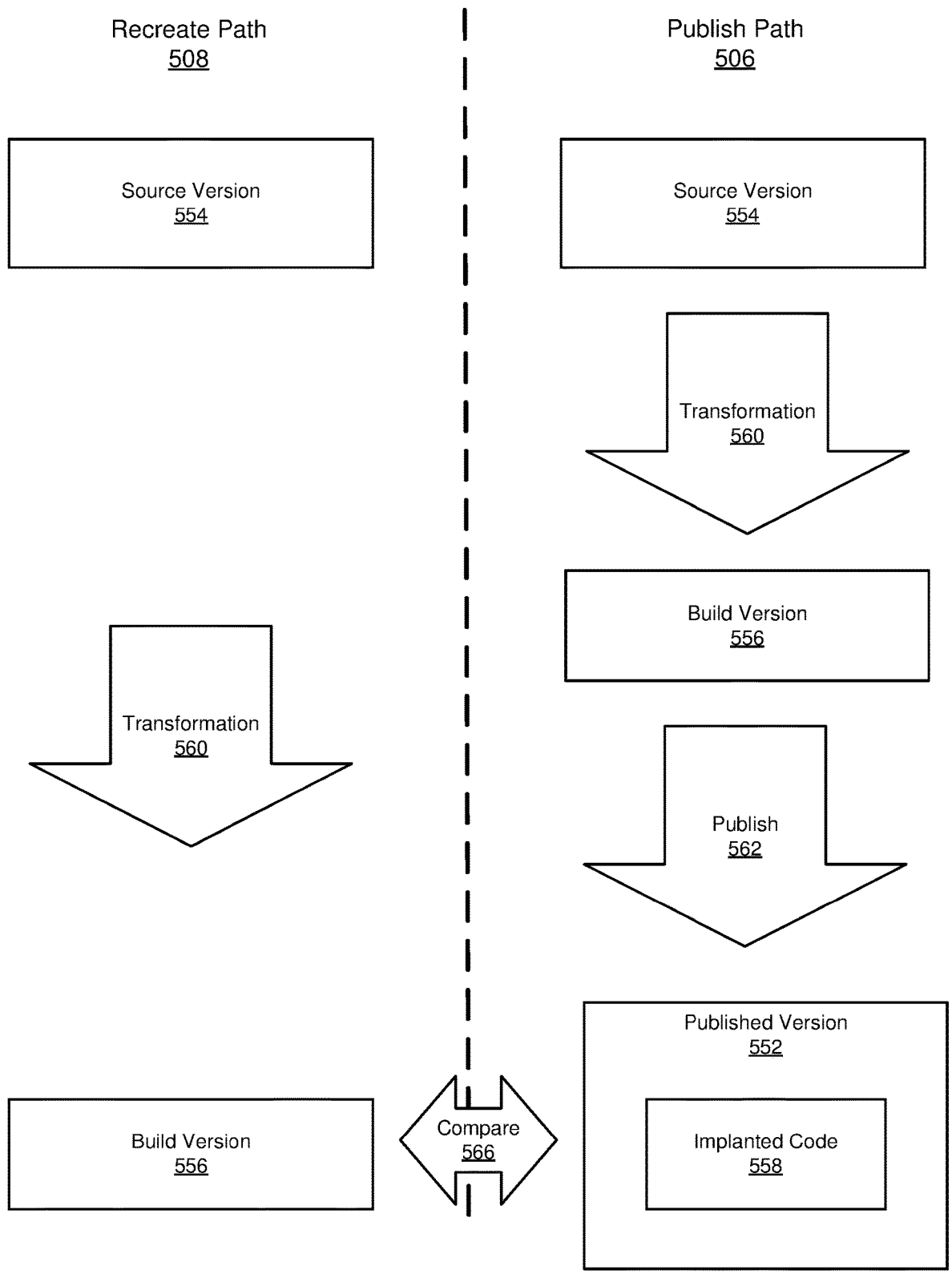
FIG. 5 is a block diagram of how different transformed versions of code are built in an example method for detecting code implanted into a published application.

FIG. 5 presents workflows illustrating how different versions of an application derived from a source version of the application may be compared in order to detect implanted code. A publish path 506 may correspond to a process for a source version 554 to be published by a developer as published version 552. A recreate path 508 may correspond to a process for source version 554 to be recreated for comparison with published version 552.

Under publish path 506, source version 554 may undergo transformation 560, for instance by the developer, to produce a build version 556. Published version 552 may preferably be substantially and significantly unchanged from build version 556. However, build version 556, as a result of publish 552, may be subject to an injection attack such that published version 552 includes an implanted code 558.

Returning to FIG. 4, determining module 106 may determine the same or substantially similar transformation 560 as used by the developer of the application. In one example, determining module 106 may determine one or more candidate transformation processes and select the candidate transformation process that produces build version 556 having the highest similarity to published version 552.

As illustrated in FIG. 4, at step 406 one or more of the systems described herein may perform the transformation process on the source version to produce a build version. For example, transformation module 108 may, as part of computing device 206 in FIG. 2, perform transformation 560 on source version 554 to produce build version 556.

The systems described herein may perform step 406 in a variety of ways. In one example, transformation module 108 may perform one or more candidate transformation processes and store, as build version 556, the result exhibiting the most similarity to published version 552.

In FIG. 5, under recreate path 508, transformation 560 may be applied to source version 554 to produce build version 556. Build version 556 under recreate path 508 may be the same or substantially similar to build version 556 under publish path 506. Transformation 560 may be selected under recreate path 508 to reproduce, as close as possible, build version 556 from publish path 506.

As illustrated in FIG. 4, at step 408 one or more of the systems described herein may compare the build version with the published version. For example, comparing module 110 may, as part of computing device 202 in FIG. 2, compare or otherwise analyze build version 556 with published version 552.

The systems described herein may perform step 408 in a variety of ways. In one example, comparing module 110 may maintain a correspondence score between build version 556 and published version 552. The correspondence score may be based on at least one of performing a byte-for-byte comparison between build version 556 and published version 552, tokenizing build version 556 and published version 552 and comparing a type or order of tokens between build version 556 and published version 552, and executing build version 556 and published version 552 and comparing outputs of build version 556 and published version 552.

Byte-for-byte comparison may include, for instance, a diff operation in which the sequence and values of bytes are directly compared. If transformation 560 is substantially accurately determined, byte-for-byte comparison may not produce many false positives. Tokenizing build version 556 may include removing names from data values and replacing names with tokens which maintain the same data types. The types and order of the tokens may match between build version 556 and published version 552 if there is no implanted code. Similarly, the outputs of build version 556 and published version 552 may match if there is no implanted code.

In some implementations, comparing module 110 may identify implanted code 558 by determining whether the correspondence score satisfies a threshold confidence value. The threshold confidence value may represent a minimum similarity percentage to determine no code has been injected. In some implementations, comparing module 110 may utilize more than one comparison. For instance, if a first comparison returns a failed similarity, a second comparison may be performed to improve accuracy. The threshold confidence value may be specific to each type of comparison and/or a weighted combination. The order of comparisons may be determined based on complexity and/or fuzziness.

The correspondence score may indicate how similar published version 552 is to build version 556. Build version 556 may be assumed to be unadulterated such that anomalies appearing in published version 552 may be detected. As seen in FIG. 5, compare 566 between build version 556 and published version 552 may reveal differences which may indicate the presence of implanted code 558 in published version 552.

As illustrated in FIG. 4, at step 410 one or more of the systems described herein may identify, based on the comparison, implanted code in the published version. For example, identification module 112 may, as part of computing device 202 in FIG. 2, identify implanted code 558 in published version 552.

The term "implanted code," as used herein, generally refers to code in an application which may be outside of the developer's planned functionality and/or product specification for the application. Implanted code may add behavior to the application which may be benign but unwanted and/or unexpected, causes errors and/or inefficiencies when running the application, and/or may be malicious. Implanted code may be added outside of a normal build procedure for the application, for example injected by an unauthorized party into the supply chain. Alternatively, a coerced or malicious developer may attempt to introduce implanted code for distribution. Examples of implanted code include, without limitation, malicious code and other security threats which may compromise operation and/or data of computing systems and networks.

The systems described herein may perform step 410 in a variety of ways. In one example, the correspondence score determined in step 408 may have failed to satisfy the threshold confidence value. Identification module 112 may analyze portions of published version 552 flagged as differing significantly from build version 556. The flagged portions may be compared against known security threats. For example, a byte pattern of the flagged portions may correspond to malicious code.

As illustrated in FIG. 4, at step 412 one or more of the systems described herein may perform, in response to identifying the implanted code, a security action. For example, security module 114 may, as part of computing device 202 in FIG. 2, perform a security action in response to identifying implanted code 558.

The term "security action," as used herein, generally refers to a preventative and/or remedial action to address a computing security threat. Examples of security actions include, without limitation, notifying appropriate administrators, quarantining infected data and/or applications, disabling applications and/or operating system functions, sandboxing, etc.

The systems described herein may perform step 412 in a variety of ways. In one example, security module 114 may perform a security action based on a threat level posed by implanted code 558. For instance, if implanted code 558 corresponds to a known threat, security module 114 may locally apply a known solution. Non-limiting examples include quarantining the application, flagging implanted code 558, removing implanted code 558 from published version 552, etc. If implanted code 558 corresponds to an unknown threat, security module 114 may disable the application and/or perform additional security analysis to better determine the threat. An administrator of the public repository and/or the developer may be sent a notification of the detected security threat.

As explained above in connection with example method 400, potential supply chain attacks may be detected for applications and/or libraries. For example, supply chain attacks to JavaScript libraries may be detected. Supply chain attacks may target vulnerabilities in deploying applications rather than attacking vulnerabilities in a development environment. A developer may develop a JavaScript library which other developers may use for their applications. The developer may make an open source version of the JavaScript library available from a source repository, such as GitHub. However, the JavaScript library may also be published to a public repository, such as Node Package Manager (NPM) package repository. NPM may be the preferred source of the JavaScript library. For instance, the version of the JavaScript library on NPM may have been minified to reduce a size of the JavaScript library and save bandwidth when transferring the JavaScript library. However, the developer may not review the minified version, thus leaving the published version vulnerable to supply chain attacks.

The developer may not directly release the minified version such that the published version may not be verified. To detect the presence of implanted code, the minified version may be recreated from the open source version. The developer may release the minification parameters used such that the minified version may be recreated with high fidelity. The recreated version may therefore stand in as an unadulterated minified version which may be used to verify the published version. If the published version is not identical or substantially similar to the recreated version, a possible supply chain code injection attack may be identified. The published version may then be quarantined, and the developer and/or publisher may be notified. Conventionally, supply chain code injection attacks may have been manually detected. The subject invention described herein may provide automated and scalable tools for detecting supply chain code injection attacks.

Figure 6:
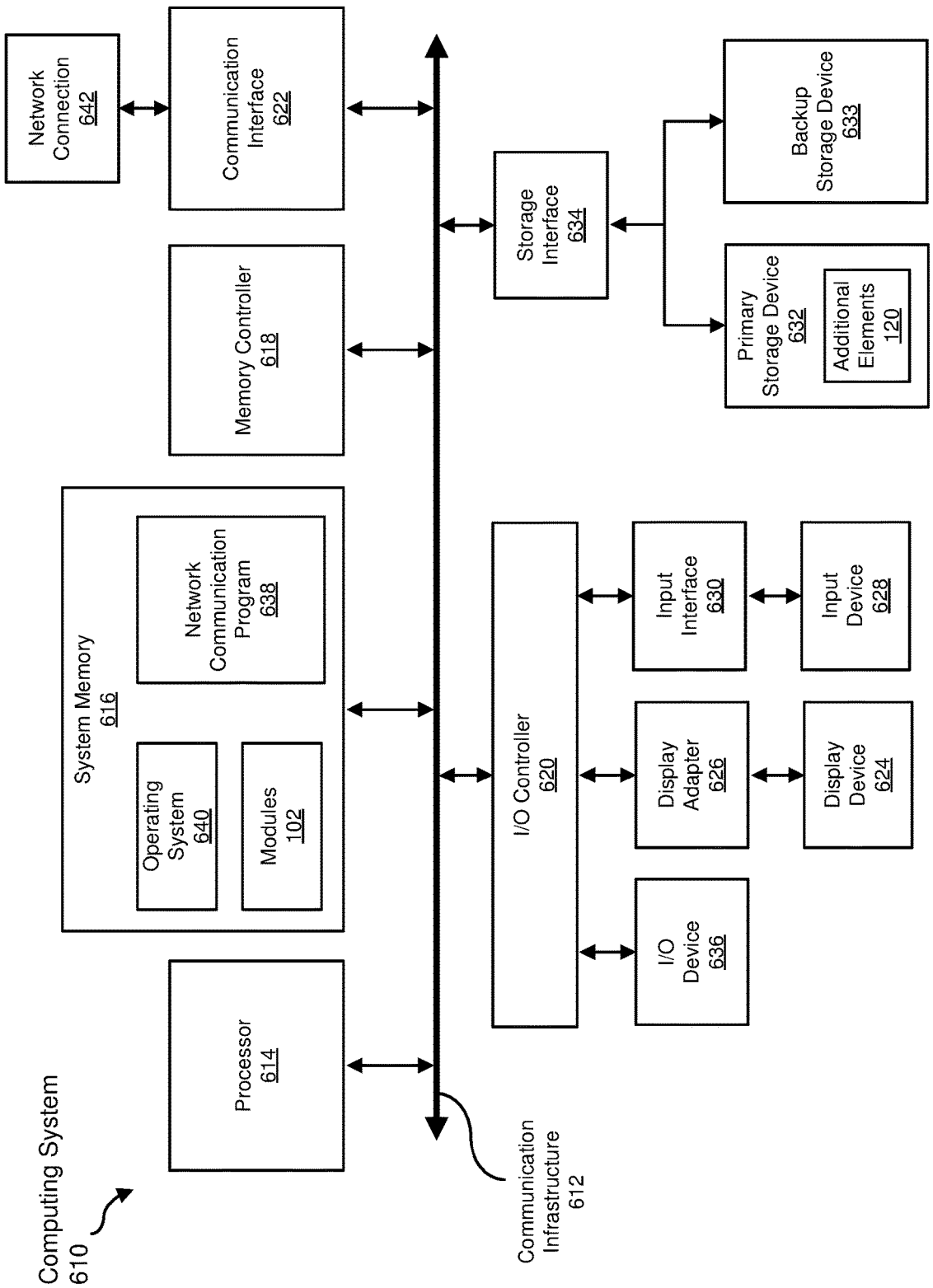
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 4). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, [additional elements 120] from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations.

For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
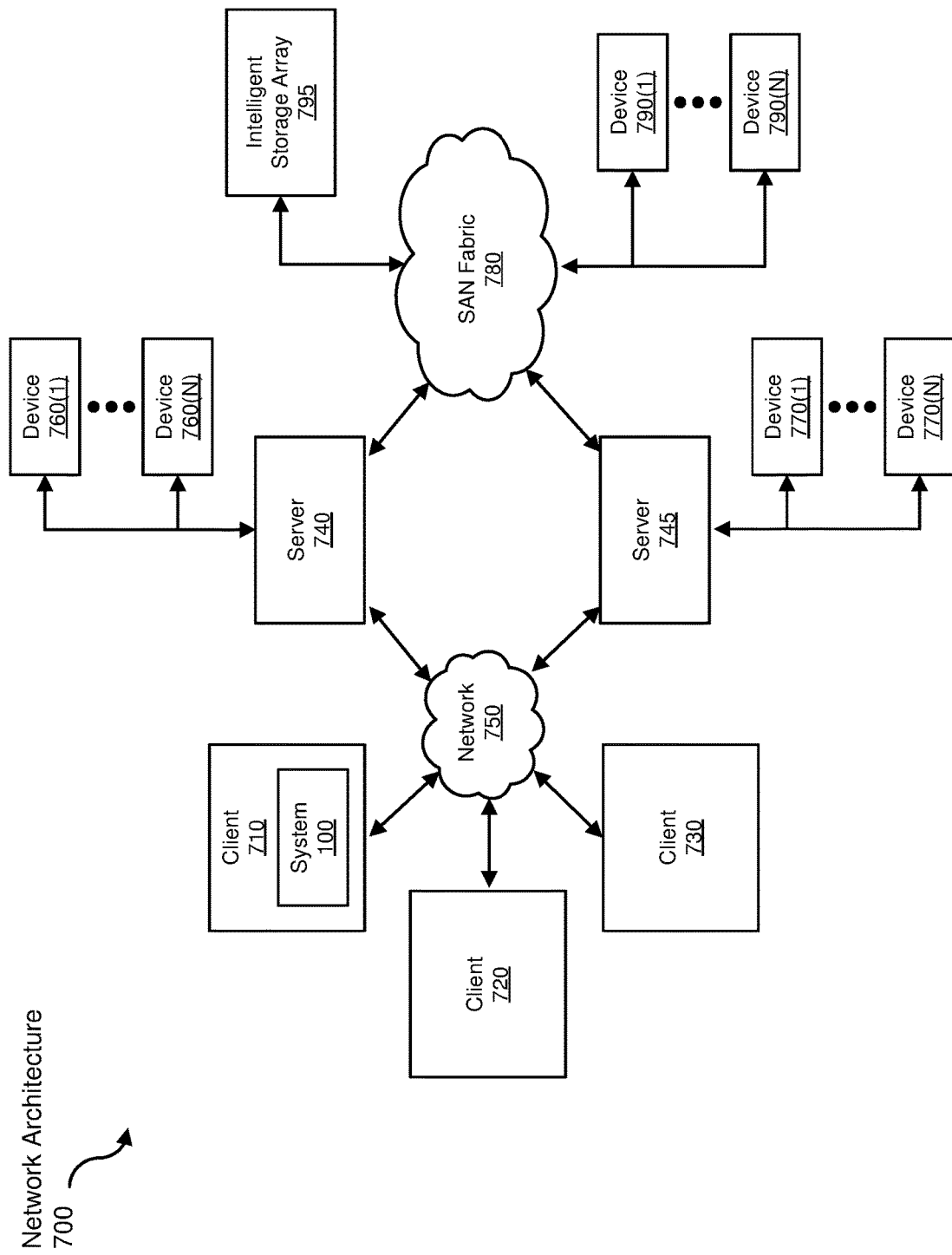
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 4). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for detecting code implanted into a published application.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive a source version of an application to be transformed, transform the source version, compare a result of the transformation to a published version of the application, and use the result of the comparison to detect implanted code. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting code implanted into a published application, at least a portion of the method being performed by a computing device comprising at least one processor, the method comprising:
   retrieving, by the computing device, a published version of an application and a source version of the application;
   determining, by the computing device and based on an analysis of the source version and the published version, a transformation process for transforming the application from the source version to the published version;
   performing, by the computing device, the transformation process on the source version to produce a build version of the application;
   comparing, by the computing device, the build version with the published version, wherein comparing the build version with the published version comprises maintaining a correspondence score based on tokenizing the build version and the published version and comparing a type or order of tokens between the build version and the published version;
   identifying, by the computing device and based on the comparison, implanted code in the published version, wherein identifying the implanted code comprises determining whether the correspondence score satisfies a threshold confidence value; and
   performing, by the computing device and in response to identifying the implanted code, a security action.

2. The method of claim 1, wherein the security action comprises one or more of quarantining the application, flagging the implanted code, removing the implanted code from the published version, sending a notification, and performing additional security analysis.

3. The method of claim 1, further comprising verifying that the source version corresponds to the published version by determining whether the source version and the published version include matches for at least one of files, identification tags, and commit tags.

4. The method of claim 1, wherein determining the transformation process comprises determining the transformation process based on at least one of a project specification associated with the source version, a configuration setup associated with the source version, and a common configuration.

5. The method of claim 1, wherein comparing the build version with the published version comprises maintaining a correspondence score based on at least one of:
   performing a byte-for-byte comparison between the build version and the published version; and
   executing the build version and the published version and comparing outputs of the build version and the published version.

6. The method of claim 1, wherein the transformation process comprises a minification process for removing non-essential bits from the source version.

7. The method of claim 1, wherein the published version is retrieved from a public repository and the source version is retrieved from a source repository.

8. A system for detecting code implanted into a published application, the system comprising:
   at least one physical processor;
   physical memory comprising computer-executable instructions that, when executed by the physical processor, cause the physical processor to:
      retrieve a published version of an application and a source version of the application;
      determine, based on an analysis of the source version and the published version, a transformation process for transforming from the source version to the published version;
      perform the transformation process on the source version to produce a build version;
      compare the build version with the published version, wherein comparing the build version with the published version comprises maintaining a correspondence score based on tokenizing the build version and the published version and comparing a type or order of tokens between the build version and the published version;
      identify, based on the comparison, implanted code in the published version, wherein identifying the implanted code comprises determining whether the correspondence score satisfies a threshold confidence value; and
      perform, in response to identifying the implanted code, a security action.

9. The system of claim 8, wherein the security action comprises one or more of quarantining the application, flagging the implanted code, removing the implanted code from the published version, sending a notification, and performing additional security analysis.

10. The system of claim 8, further comprising verifying that the source version corresponds to the published version by determining whether the source version and the published version include matches for at least one of files, identification tags, and commit tags.

11. The system of claim 8, wherein determining the transformation process comprises determining the transformation process based on at least one of a project specification associated with the source version, a configuration setup associated with the source version, and a common configuration.

12. The system of claim 8, wherein comparing the build version with the published version comprises maintaining a correspondence score based on at least one of:
   performing a byte-for-byte comparison between the build version and the published version;
   and executing the build version and the published version and comparing outputs of the build version and the published version; and wherein identifying the implanted code comprises determining whether the correspondence score satisfies a threshold confidence value.

13. The system of claim 8, wherein the transformation process comprises a minification process for removing non-essential bits from the source version.

14. The system of claim 8, wherein the published version is retrieved from a public repository and the source version is retrieved from a source repository.

15. A non-transitory computer-readable medium comprising one or more computer-executable instructions that, when executed by at least one processor of a computing device, cause the computing device to:

retrieve a published version of an application and a source version of the application;

determine, based on an analysis of the source version and the published version, a transformation process for transforming from the source version to the published version;

perform the transformation process on the source version to produce a build version;

compare the build version with the published version, wherein comparing the build version with the published version comprises maintaining a correspondence score based on tokenizing the build version and the published version and comparing a type or order of tokens between the build version and the published version;

identify, based on the comparison, implanted code in the published version, wherein identifying the implanted code comprises determining whether the correspondence score satisfies a threshold confidence value; and perform, in response to identifying the implanted code, a security action.

16. The non-transitory computer-readable medium of claim 15, wherein the security action comprises one or more of quarantining the application, flagging the implanted code, removing the implanted code from the published version, sending a notification, and performing additional security analysis.

17. The non-transitory computer-readable medium of claim 15, further comprising verifying that the source version corresponds to the published version by determining whether the source version and the published version include matches for at least one of files, identification tags, and commit tags.

18. The non-transitory computer-readable medium of claim 15, wherein determining the transformation process comprises determining the transformation process based on at least one of a project specification associated with the source version, a configuration setup associated with the source version, and a common configuration.

19. The non-transitory computer-readable medium of claim 15, wherein comparing the build version with the published version comprises maintaining a correspondence score based on at least one of:

performing a byte-for-byte comparison between the build version and the published version; and executing the build version and the published version and comparing outputs of the build version and the published version.

20. The non-transitory computer-readable medium of claim 15, wherein the transformation process comprises a minification process for removing non-essential bits from the source version, the published version is retrieved from a public repository, and the source version is retrieved from a source repository.

* * * * *